Figure 1:
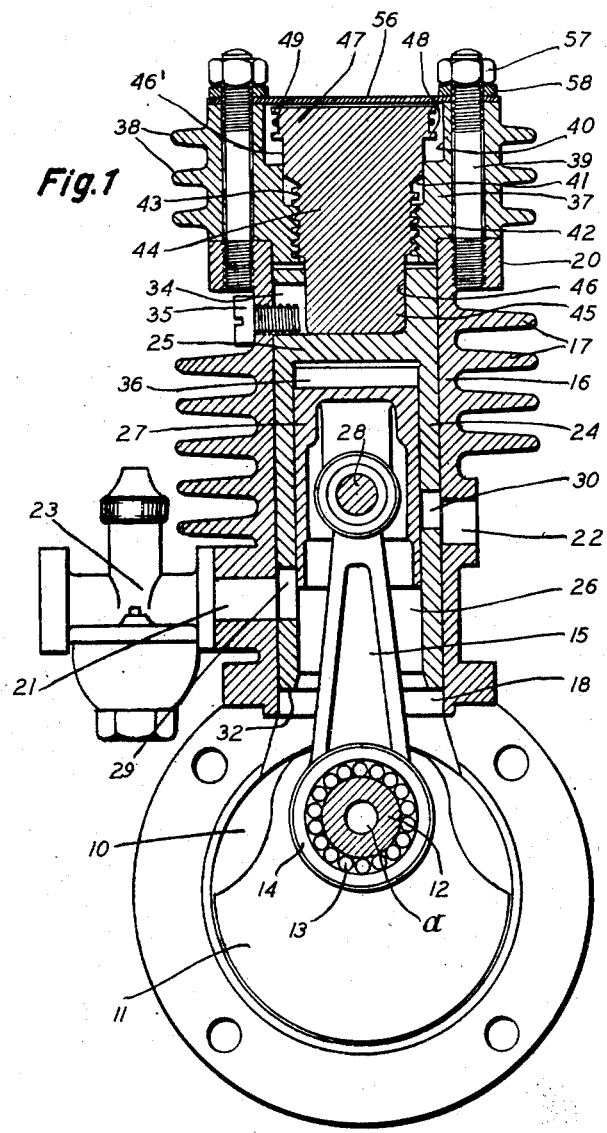

Jan. 22, 1952 H. TEEGEN 2,583,499
INTERNAL-COMBUSTION ENGINE
Filed April 30, 1949 4 Sheets-Sheet 1

Inventor
HERMANN TEEGEN
by
*Walter S Blenton*

Attorney

Jan. 22, 1952  H. TEEGEN  2,583,499
INTERNAL-COMBUSTION ENGINE
Filed April 30, 1949  4 Sheets-Sheet 2

Inventor
HERMANN TEEGEN
by
Walter S. Alston
Attorney

Jan. 22, 1952     H. TEEGEN     2,583,499
INTERNAL-COMBUSTION ENGINE
Filed April 30, 1949     4 Sheets-Sheet 3
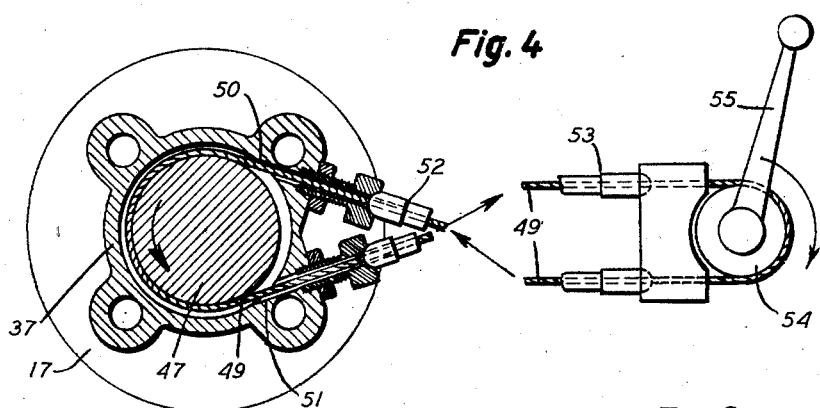
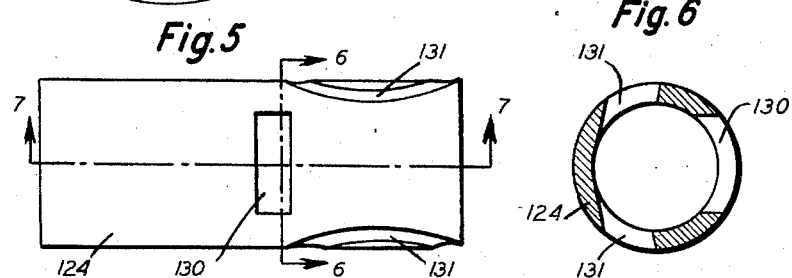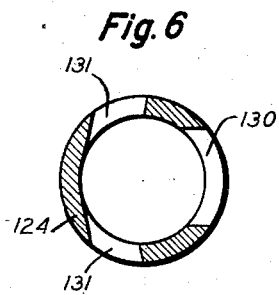
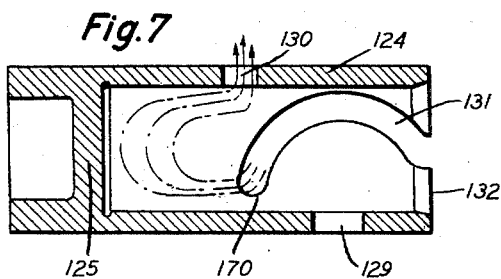
Inventor
HERMANN TEEGEN
by
Walter S. Alerton
Attorney Jan. 22, 1952     H. TEEGEN     2,583,499
INTERNAL-COMBUSTION ENGINE Filed April 30, 1949     4 Sheets-Sheet 4

Inventor
HERMANN TEEGEN

Attorney

Patented Jan. 22, 1952

2,583,499

UNITED STATES PATENT OFFICE 2,583,499

INTERNAL-COMBUSTION ENGINE

Hermann Teegen, Bunde, Germany, assignor to Lohmann-Werke A. G., Bielfeld, Germany, a corporation of Germany Application April 30, 1949, Serial No. 90,619
In France September 3, 1948

4 Claims. (Cl. 123—48)

The present invention relates to an internal combustion engine. The conventional internal combustion engine operates either according to the Otto principle or to the diesel principle. Both have their drawbacks. The Otto engine requires, for ignition of the mixture, electrical appliances which are costly and subject to many disturbances, and the diesel engine needs an air compressor and a fuel injection pump which is also susceptible to frequent failures.

The invention aims to provide a new type engine and a method to run such engine which does not need the mentioned ancillary equipment and which avoids at least the majority of the mentioned drawbacks. The invention is based on the knowledge that practically any inflammable mixture of a fuel and air can be self-ignited if it is sufficiently compressed.

In order to render self-ignition possible for practical purposes, the invention further aims to provide an internal combustion engine in which the volume of the compression chamber can be varied thereby to vary the rate of compression according to the kind of the fuel used, and in order to run the engine with a self-igniting mixture, which means that compression ratios of more than 20:1 and even as high as 50:1 may be reached.

According to the invention an engine of the mentioned type can be operated by first turning its crankshaft with the aid of an external drive while the compression chamber is set for a large volume; then, when the R. P. M. are high enough, reducing the size of the compression space to attain a compression ratio sufficiently high to cause self-ignition of the fuel mixture; and, finally, increasing the compression chamber, thereby reducing the ratio of compression to a value most favorable for the operation of the engine.

In order to adapt an Otto engine for more efficient operation at high altitudes, it has been proposed to render the compression chamber variable by either varying the piston stroke or by shifting the cylinder block in relation to the crank shaft axis. However, the complication of the structure of such an engine prohibited its use in actual service.

The invention aims, therefore, to provide an engine operative according to the new principle wherein variability of the compression chamber is attained by means of great simplicity which, in addition, are advantageous in other respects.

The invention essentially consists in that a barrel having a closed end and in which the conventional piston reciprocates, is axially shiftable in a stationary cylinder, means being provided to transmit the end pressure of the barrel to the cylinder and to adjust the spacing of the barrel from the crank case axis.

Figure 2:
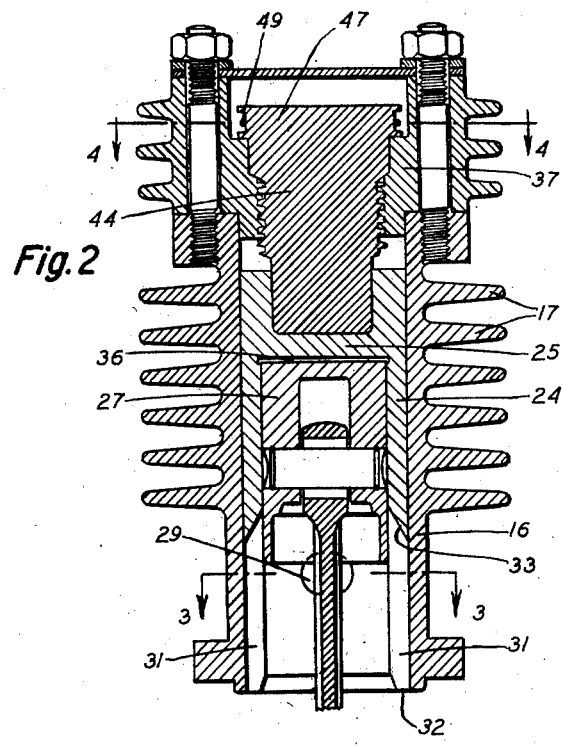
Figure 3:
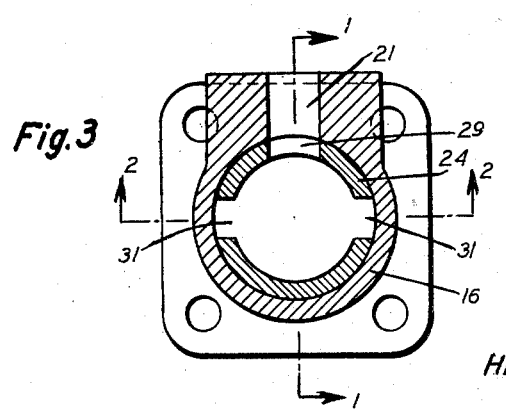
Figure 8:
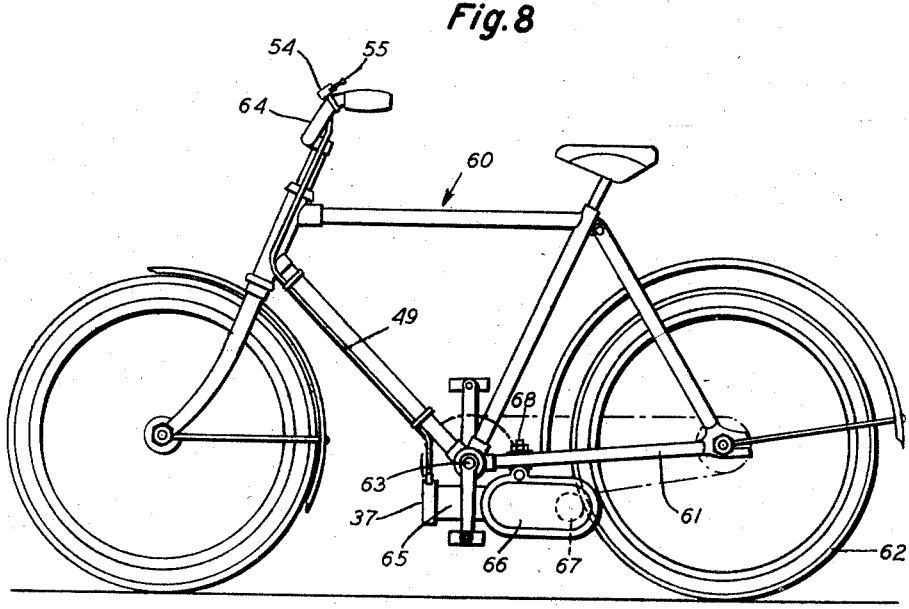

As the invention is particularly suited for two-stroke engines it will be described with reference to an engine of that type. However, it is to be understood that it is also advantageously applicable to four-stroke engines. Further objects and details of the invention will be apparent from the description given hereinafter and the accompanying drawing illustrating an embodiment thereof by way of example. In the drawing, Fig. 1 is a longitudinal section of a motor according to the invention, Fig. 2 is a cross-section along line 2—2 of Fig. 3, Figs. 3 and 4 are cross-sections along lines 3—3 and 4—4, respectively, of Fig. 2, Fig. 5 is an elevation of a modified cylinder barrel for use with the motor of Fig. 1, Figs. 6 and 7 are cross-sections along lines 6—6 and 7—7, respectively, of Fig. 5, Fig. 8 is an illustration of a bicycle to which a motor according to the invention is applied.

Referring now to the drawing, Figs. 1-4 show a two-stroke motor according to the invention which comprises a crank-case 10 in which a crank shaft is rotatable about an axis $a$. A crank cheek 11 of a shape conventional with two-stroke motors is provided with a crank pin 12 surrounded by an antifriction bearing 13 which is engaged by the lower end 14 of a piston rod 15. An outer cylinder 16 having cooling ribs 17 is mounted on the crank case 10 and secured thereto by means not shown. Cylinder 16 is open at both its ends. The lower end 18 communicates with the interior of the crank case 10; the upper end is provided with a flange 20 for a purpose to be explained hereinafter. The cylinder 16 has an inlet port 21 and an exhaust port 22 on diametrically opposite sides of the cylinder. Port 21 which is connected to a carburetor 23 is arranged on a lower level than port 22. A barrel 24 fits into the cylinder 16 and is shiftable relatively thereto in an axial direction. The barrel is open at both its ends, but has a bottom 25 close to its upper end. Within the lower barrel chamber 26, a fitting piston 27 which may be ringless for reasons to be explained hereinafter, is reciprocable through the agency of the piston rod 15 to the upper end of which it is connected by means of the piston pin 28. The barrel has two openings 29 and 30 so located and of such sizes that they communicate with the inlet port 21 and the exhaust port 22, respectively, regardless of the relative position of the barrel and the cylinder 16.

Furthermore, the barrel is provided with at least one recess—in the illustrated embodiment there are two such recesses 31—which extend, intermediate the ports 29 and 30, in an axial direction upward from the lower barrel edge 32 approximately to the level of the exhaust opening 30. The upper ends of the recesses are preferably beveled as clearly shown at 33 in Fig. 2.

Means are provided to prevent the barrel from turning in relation to the cylinder. For this purpose, a slot 34 is provided in the barrel wall above bottom 25, and a screw 35 is screwed through the cylinder wall so as to project into the slot 34, thus permitting a limited axial shift of the barrel but inhibiting rotation.

It will be clear that the barrel space 36 intermediate the piston 27 and bottom 25 constitutes the compression chamber of the motor and that its size depends on the position of the barrel 24 relatively to the cylinder 16 as the piston stroke is invariable. Thus, in Fig. 1 where the barrel is shown in its topmost position, the size of the compression chamber 36 is a maximum, whereas in Fig. 2 with the barrel in its lowermost position, the size of the chamber is a minimum. Now in order to vary the size of the compression chamber within the mentioned limits, means are provided to shift the barrel within the cylinder. For this purpose the cylinder 16 is provided with a hollow head 37 having cooling ribs 38 on its outside. The head is secured to the flange 20 by studs 39. Interiorly, the head is shaped in three sections, the topmost one 40 of which is cylindrical, and so is the second one 41 but stepped in relation to the first one. The third section 42 is interiorly screw threaded. This threading is engaged by the exterior threading 43 of a screw bolt 44 which projects with its end portion 45 downwardly into the upper space 46 on top of the barrel bottom 25 on which it bears. The upper shank portion 46' of the bolt is guided in the second section 41 of the cylinder head 37 and the bolt head 47 is located within the first section 40. Now it will be clear that by turning bolt 44 so as to screw it in, the end portion 45 bearing on the barrel bottom 25 will shift the barrel downward in the cylinder 16, whereas, if the bolt is turned in the other direction, the barrel will follow the bolt upwards as there is always a pressure prevailing between barrel bottom and piston above atmospheric pressure. Means are provided to turn the bolt 44 thereby to adjust the volume of the compression chamber of the motor. For this purpose, the bolt head 47 is provided with a peripheral groove 48 in which a flexible member as e. g. a Bowden wire 49 engages. This wire is passed to the outside through two bores 50, 51 in the wall of the cylinder head 37 as clearly shown in Fig. 4. Guiding means such as 52 and 53 may be provided to conduct the wire around a control drum 54 with crank arm 55 which may be located at any place suitable for the control of the motor. Hence, by turning the arm 55 the wire 49 will be taken along so as to turn the bolt 44 accordingly. A cover plate 56 may be provided in order to close the cylinder head on top and may be secured by the nuts 57 with washers 58 screwed on the studs 39 by means of which the cylinder head 37 is fastened to the cylinder 16.

The operation of a motor of the type just described will now be explained in connection with Fig. 8 which diagrammatically shows the motor applied to a bicycle of conventional design. The bicycle, in general denoted by 60 comprises a lower frame bar 61, a rear wheel 62, a pedal drive 63 and a handle bar 64. The motor 65 is combined with a transmission 66 including a friction wheel 67 in engagement with the rear wheel 62, and is fastened to the frame bar 61 at 68. The control drum 54 with control arm or lever 55 is attached to the handle bar 64 and the Bowden wire 49 runs down from there to the cylinder head 37.

In order to start the motor, first the compression chamber 36 is adjusted for its maximum volume by turning the bolt 44 with the aid of arm 55 and the Bowden wire 49. Thereupon, the crank shaft is rotated by means of an extraneous drive. In the case of the bicycle of Fig. 8, this may be accomplished by either pedaling or pushing the bicycle forward so that the rear wheel 62 drives the friction wheel 67 of the transmission 66. When during the rotation of the crank shaft the piston 27 is in or close to its upper dead center position a mixture of air and atomized fuel can enter the space underneath the piston, and the crank case from the carburetor 23 through the ports 21 and 29. On its downward stroke, the piston first closes the opening 29 and, shortly before reaching the lower dead center, opens the exhaust ports 30 and 22 so that combustion gases can escape from the compression chamber 36. At approximately the same time the piston passes the upper ends of the recesses 31 which serve as passage ways from the interior of the crank case 10 to the compression chamber 36. In consequence the mixture slightly precompressed in the crank case due to the descending piston can enter the chamber 36 simultaneously scavenging it until during the upward stroke the ports 30 and 22 and the recesses 31 are again closed by the piston, whereupon the mixture in the chamber 36 will be compressed. As in the beginning of the starting operation the compression space is a maximum and hence the compression rate a minimum, no self-ignition will occur. When now the extraneous drive has imparted to the motor a sufficiently high R. P. M., the barrel 24 will be shifted downward by turning the control arm 55. Thereby the size of the compression chamber will be decreased and the rate of compression increased until self-ignition of the mixture takes place and the motor begins to run on its own power. When, then, the motor runs continuously, the compression chamber may be adjusted by turning the control arm 55 in the opposite direction until the compression ratio most favorable to the operation of the motor is reached. This point can readily be ascertained by ear and or by the increase or decrease of the output.

In addition to its high efficiency and other advantages mentioned hereinbefore, the illustrated engine embodies a number of very important features. In this respect it will be noticed that the forces due to compression and combustion are transmitted through the very strong screw bolt 44 to the cylinder head, and from there through the cylinder 16 to the crank case 10. The whole engine requires only a minimum of parts none of which requires any special servicing. The number of parts can be still more reduced if the cylinder and the cylinder head are made of one piece.

Furthermore, it has been stated that the passageways for conducting the precompressed mixture from the crankcase 10 to the compression chamber 33 are provided by the axial recesses 31 in the barrel 24. This structure offers important advantages. First, the shortness of these ways allows for a fast passage of the mixture, and, in consequence permits the engine to run at a high speed. Furthermore, owing to its direct contact with the piston wall, the fresh mixture passing through the recesses 31 has a strongly cooling effect on the piston. Reversely, the mixture is heated by the hot piston and the increase of its temperature increases its inflammability so that the desired self-ignition will occur at a rate of compression lower than otherwise required. The cooling of the piston in the manner just described helps to solve another problem. In engines operating with a high rate of compression, piston rings are subject to a considerable wear. Furthermore, particularly if fuels containing asphalt are used, the rings tend to stick whereby their tightness is frequently impaired. The danger of sticking will be still increased if oil carbon deposits due to incomplete combustion. Now, the strong cooling effect attained by the provision of the recesses in the described manner, renders it possible, at least in many instances, to employ a ringless piston so that a sticking of piston rings cannot occur. The ringless piston calls for an extremely small clearance between it and the barrel. However, the danger of the ringless piston jamming in the barrel owing to such narrow clearance can be avoided, if the piston is made of the same material as the barrel so that both have the same coefficient of expansion. In addition I found it advisable to provide such ringless piston with a coating of a hard material, as e.g. a hard chromium plating.

The favorable effect of the recesses provided in the barrel can be further improved if the recesses are curved e. g. in the shape of a semicircle as shown in the modified barrel illustrated in Figures 5 to 7. In this barrel 124 the recesses 131 start from the lower barrel edge 132, curve first towards the wall portion with the exhaust opening 130 and then towards the wall portion with the inlet opening 129 so that they finally end at 170 remote from the exhaust opening 130. The so shaped passage ways or recesses allow for a very efficient scavenging. When during the downward stroke of a piston such as 27 in Figs. 1 and 2, in a barrel such as 124 the controlling edge 27 of the piston begins to open the upper end 170 of the recesses 131, the fresh mixture will first rise along the barrel wall portion remote from the exhaust opening 122, then be reversed by the barrel bottom 125 to reach that opening by passing along the wall portion in which it is provided, substantially as indicated by the arrows b. While the piston continues its downward stroke a wider portion of the passage ways will be opened with the result that also the barrel core will be engaged by the scavenging current so as to ensure a maximum scavenging effect. During such scavenging period no fresh mixture will directly pass to the exhaust opening inasmuch as the inertia of the highly accelerated gases guided according to the curvature of the recesses will prevent the gases from turning sharply towards that opening.

Although I have illustrated and described only one embodiment of my invention it will be apparent to those skilled in the art that many alterations and modifications thereof are possible without departure from the spirit and essence of my invention which, for that reason, shall not be limited but by the scope of the appended claims.

I claim:

1. In a two-stroke internal combustion engine including a crank case and a piston, the combination of a cylinder stationary with respect to said crankcase, a barrel in which said piston is reciprocable, said barrel being fitted into said cylinder so as to be axially shiftable in relation thereto and having that end closed which is remote from the crank case, and means to adjust the axial position of the barrel in said cylinder, said barrel and said cylinder having communicating inlet openings under the control of the one piston edge and having outlet openings under the control of the other piston edge, and said barrel being provided with at least one recess extending from the open barrel end in a substantially axial direction, said recess being controlled by said other piston edge so as to form a passageway from said crankcase to the barrel space underneath said bottom.

2. An engine as claimed in claim 1, wherein said recess is curved, beginning at the open barrel end intermediate the wall portions provided with said inlet and outlet openings respectively, first curving towards the side of the outlet openings and then towards the side of the inlet openings, and ending closer to the wall portion provided with said inlet opening than to the other wall portion.

3. An engine as claimed in claim 1 wherein said inlet and outlet openings in said barrel are arranged in opposite side wall portions thereof, said barrel being provided with two recesses in the opposite wall portions, respectively, intermediate those in which said inlet and outlet openings are provided, both said recesses beginning at the open barrel end, being first curved towards the side of the outlet opening and then towards the side of the inlet opening, and ending closer to the wall portion provided with said inlet opening than to that with the outlet opening.

4. In an internal combustion engine including a crank case, a cylinder stationary with respect to said crank case, a barrel shiftable in said cylinder in the direction of its axis in relation to said crank case and being closed at its end remote from said crank case, and a piston reciprocable in said barrel, and means in communicating connection with said crank case for admitting fuel and air into it, said barrel being provided with at least one slot extending substantially lengthwise of said barrel and passing therethrough, said slot being at least part of its length covered by said piston on the inside of said barrel and being covered substantially throughout its length by said cylinder on the outside of said barrel, so as to form a passage for quantities of air and fuel from said crank case to the combustion chamber between said piston and the closed barrel end.

HERMANN TEEGEN.

REFERENCES CITED

The following references are of record in the file of this patent:

UNITED STATES PATENTS

| Number | Name | Date |
| --- | --- | --- |
| 810,565 | Porter et al. | Jan. 23, 1906 |
| 882,401 | Melhuish | Mar. 17, 1908 |
| 887,633 | Heginbottom et al. | May 12, 1908 |
| 996,434 | Talley | June 27, 1911 |
| 1,125,375 | Newton et al. | Jan. 19, 1915 |
| 1,360,366 | Charter | Nov. 30, 1920 |
| 1,429,164 | Ramsey | Sept. 12, 1922 |
| 1,665,607 | Sargent | Apr. 10, 1928 |
| 1,680,710 | Wall | Aug. 14, 1928 |
| 1,792,201 | Treiber | Feb. 10, 1931 |
| 1,795,309 | Marshall | Mar. 10, 1931 |

FOREIGN PATENTS

| Number | Country | Date |
| --- | --- | --- |
| 129,373 | Switzerland | Dec. 17, 1928 |
| 415,615 | Great Britain | Aug. 30, 1934 |
| 522,682 | Great Britain | June 25, 1940 |